United States Patent [19]

Denis et al.

[11] Patent Number: 5,700,598

[45] Date of Patent: Dec. 23, 1997

[54] METHOD FOR PREPARING MIXED AMORPHOUS VANADIUM OXIDES AND THEIR USE AS ELECTRODES IN REACHARGEABLE LITHIUM CELLS

[75] Inventors: Sophie Denis; Francois Orsini, both of Amiens, France; Jean-Marie Tarascon, Martinsville, N.J.; Marcel Touboul, Paris, France

[73] Assignee: Bell Communications Research, Inc., Morristown, N.J.

[21] Appl. No.: 678,210

[22] Filed: Jul. 11, 1996

[51] Int. Cl.$^6$ .................................................. H01M 4/48
[52] U.S. Cl. ................................................... 429/218
[58] Field of Search .......................................... 429/218

[56] References Cited

U.S. PATENT DOCUMENTS

| | | | |
|---|---|---|---|
| 4,675,260 | 6/1987 | Sakurai et al. | 429/191 |
| 5,039,582 | 8/1991 | Pistoia | 429/218 |
| 5,284,721 | 2/1994 | Beard | 429/194 |
| 5,334,334 | 8/1994 | Koksbang | 264/38 |
| 5,453,337 | 9/1995 | Willmann et al. | 429/218 |
| 5,498,494 | 3/1996 | Takeuchi et al. | 429/219 |

OTHER PUBLICATIONS

Chemical Abstracts Accession No. 105:899960 CA, Toboul et al. J. Therm. Anal. (1986), 31(1) 117–124 (month unknown), 1986.

Bhattacharya et al., Solid State Communications, vol. 91, No. 5 pp. 357–360, "Low Temperature Synthesis of a Bismuth Vanadium Oxide Isomorphous with B4V2O11" (month unknown), 1994.

Prokupkova et al., J. Materials Science, 31 (1996) 3391–3395 (month unavailable), 1996.

Sigala et al., "Amorphous lithium metal vanadium oxide compounds . . . ", CA Accession No. 125:304946, FR 2725709, Apr. 19, 1996.

Sigala et al., "Synthesis and performances of new negative electrode materials . . . ", CA Accession No. 123:61226, Inst. Mater. Nantes, Nantes, 44072, Fr. C.R. Acad.Sci., Ser.II: Mec., Phys., Chim., Astron. (1995), 320 (10), 523–9(month unavailable), 1995.

Myazaki et al., CA Accession No. 112: 81039 "Secondary lithium batteries", JP 012654456, Oct. 1989.

*Primary Examiner*—Stephen Kalafut
*Assistant Examiner*—Carol Chaney
*Attorney, Agent, or Firm*—Lionel N. White; Joseph Giordano

[57] ABSTRACT

A method for preparing an amorphous ternary lithiated vanadium metal oxide of the formula $Li_xM_yV_zO_{(x+5z+ny)/2}$, where M is a metal, $0<x\leq3$, $0<y\leq3$, $1\leq z\leq4$, and n=2 or 3, comprising the steps of creating an aqueous solution of at least one metavanadate salt selected from the group consisting of $NH_4VO_3$ and $NaVO_3$, and a nitrate salt of the formula $M(NO_3)_n$ containing a large excess of a lithium salt; heating the solution; adding a sufficient amount of a base to obtain a suitable pH; and precipitating the amorphous lithiated vanadium metal oxide. A rechargeable lithiated intercalation battery cell comprising a positive electrode, a negative electrode, and an electrolyte, wherein the active material of the negative electrode is an amorphous ternary lithiated vanadium metal oxide of the formula $Li_xM_yV_zO_{(x+5z+ny)/2}$ or an amorphous binary non-lithiated vanadium metal oxide of the formula $M_yV_zO_{(5z+ny)/2}$, prepared according to the methods of the present invention.

13 Claims, 7 Drawing Sheets

METHOD FOR PREPARING MIXED AMORPHOUS VANADIUM OXIDES AND THEIR USE AS ELECTRODES IN REACHARGEABLE LITHIUM CELLS

BACKGROUND OF THE INVENTION (1) Field of the Invention

This invention relates to a novel method for synthesizing an amorphous ternary lithiated vanadium metal oxide of the formula $Li_xM_yV_zO_{(x+5z+ny)/2}$, where M is a metal, $0<x\leq3$, $0<y\leq3$, $1\leq z\leq4$, and $n=2$ or 3; to a novel method for preparing an amorphous binary non-lithiated vanadium metal oxide of the formula $M_yV_zO_{(5z+ny)/2}$, where M is a metal, $0<y\leq3$, $1\leq z\leq4$, and $n=2$ or 3; and to a rechargeable lithiated intercalation battery cell comprising a positive electrode, a negative electrode, and an electrolyte, wherein the active material of the negative electrode is an amorphous ternary lithiated (Li-M-V-O) vanadium metal oxide of the formula $Li_xM_yV_zO_{(x+5z+ny)/2}$ or an amorphous binary non-lithiated (M-V-O) vanadium metal oxide of the formula $M_yV_zO_{(5z+ny)/2}$, prepared according to the methods of the present invention.

(2) Description of Related Art

Lithium ion secondary cells represent an economically important sector of the battery market. One commercially significant embodiment of such secondary cells employs a lithiated intercalation metal oxide as the positive electrode and a carbonaceous material as the negative electrode. Typical such cells are described in U.S. Pat. No. 5,460,904, which is incorporated herein by reference. Commonly employed lithiated metal oxides include $LiCoO_2$, $LiNiO_2$, and $LiMn_2O_4$, of which $LiCoO_2$ is the most widely employed material. A common feature of all these lithiated metal oxides is that only about 0.5 lithium atoms per transition metal can be practically used in the charge/discharge cycles of the cells. Research investigations continue in a search for better, cheaper, and more efficient electrode materials.

Attempts to increase the capacity of such cells are primarily focused in four areas: (1) improving the existing cobalt-, nickel-, or manganese-based oxides; (2) searching for new lithiated metal oxides appropriate for use in lithiated intercalation cells; (3) enhancing the electrochemical characteristics of the carbonaceous negative electrode; and (4) finding alternative materials to substitute for the carbonaceous negative electrode in lithiated intercalation cells.

Various researchers have sought, with limited success, to improve the reversible capacity of the carbonaceous material in a lithiated intercalation cell. J. Dahn et al. attempted to improve the electrochemical characteristics of the carbonaceous material by means of pyrolytic processing of organic materials to obtain a carbonaceous electrode material. J. Dahn et al., *Lithium batteries*, (1994). F. Disma et al. has explored mechanical processing of the negative electrode material so as to augment its electrochemical capacity. Unfortunately, these approaches have not proved significantly successful.

Recently, Yoshio et al. in Japanese patent application JP 106642/92 and Guyomard et al., C.R. Acad. Sci. Paris, 320, 523 (1995), suggested a possible new approach in negative electrode technology. These two research groups discovered that some lithiated vanadium oxide-based electrodes (initially sought as potential candidates for positive electrode materials), when discharged to voltages lower than about 0.2 V, could reversibly intercalate lithium ions in amounts up to about 7 lithium atoms per transition metal atom.

However, these disclosures indicated that such lithiated vanadium oxide-based were problematic when employed as electrodes. Guyomard et al. produced its lithiated vanadium oxides by means of an initial crystallization, a process which severely limits its suitability as an electrode material in commercial cells. Yoshio et al. disclosed lithium metal oxide compounds that had been manufactured by means of a method which required calcination and annealing at temperatures greater than 500° C. for a period of a several days. Further, the compounds of Yoshio had also undergone an initial crystallization, as well as containing large numbers of diverse metallic elements that tend to become amorphous upon initial discharge. Thus, there remains a need for an efficient and effective synthesis of amorphous lithiated and non-lithiated vanadium oxide materials which are suitable for use as the active material in negative electrodes of commercial significant lithiated intercalation secondary cells.

SUMMARY OF THE INVENTION

Accordingly, an object of the present invention is to provide a novel method for synthesizing an amorphous ternary lithiated vanadium metal oxide of the formula $Li_xM_yV_zO_{(x+5z+ny)/2}$, where M is a metal, $0<x\leq3$, $0<y\leq3$, $1\leq z\leq4$, and $n=2$ or 3, which yields the ternary lithiated vanadium metal oxide in an amorphous form by means of a simple, efficient synthesis.

It is another object of the present invention to provide a novel method for preparing an amorphous binary non-lithiated vanadium metal oxide of the formula $M_yV_zO_{(5z+ny)/2}$, where M is a metal, $0<y\leq3$, $1\leq z\leq4$, and $n=2$ or 3, which yields the binary non-lithiated vanadium metal oxide in an amorphous form by means of a simple, efficient synthesis.

It is a still further object of the present invention to provide a rechargeable lithiated intercalation battery cell comprising a positive electrode, a negative electrode, and an electrolyte, wherein the active material of the negative electrode is an amorphous ternary lithiated vanadium metal oxide of the formula $Li_xM_yV_zO_{(x+5z+ny)/2}$ or an amorphous binary non-lithiated vanadium metal oxide of the formula $M_yV_zO_{(5z+ny)/2}$, prepared according to the methods of the present invention.

These objects, among others, have been achieved by means of a method for preparing an amorphous ternary lithiated vanadium metal oxide of the formula $Li_xM_yV_zO_{(x+5z+ny)/2}$, where M is a metal, $0<x\leq3$, $0<y\leq3$, $1\leq z\leq4$, and $n=2$ or 3, comprising the steps of creating an aqueous solution of at least one metavanadate salt selected from the group consisting of $NH_4VO_3$ and $NaVO_3$, and a nitrate salt of the formula $M(NO_3)_n$, containing a large excess of a lithium salt; heating the solution; adding a sufficient amount of a base to obtain a pH greater than 8; and precipitating the amorphous lithiated vanadium metal oxide.

In addition, these objects, among others, have been achieved by means of a method for preparing an amorphous binary non-lithiated vanadium metal oxide of the formula $M_yV_zO_{(5z+ny)/2}$, where M is a metal, $0<y\leq3$, $1\leq z\leq4$, and $n=2$ or 3, comprising the steps of creating an aqueous solution of at least one metavanadate salt selected from the group consisting of $NH_4VO_3$ and $NaVO_3$, and a nitrate salt of the formula $M(NO_3)_n$; heating the solution; adding a sufficient amount of an acid to obtain a suitable pH for dissolution; adding a sufficient amount of a base to obtain a suitable pH for precipitating the amorphous binary non-lithiated vanadium metal oxide.

Still further, these objects, among others, have been achieved by means of a non-aqueous secondary cell comprising an active negative electrode material, an active positive electrode material and an non-aqueous electrolyte, wherein said active negative electrode material is an amorphous ternary lithiated vanadium metal oxide of the formula $Li_xM_yV_zO_{(x+5z+ny)/2}$, where M is a metal, $0<x\leq3$, $0<y\leq3$, $1\leq z\leq4$, and n=2 or 3, said amorphous ternary lithiated vanadium metal oxide prepared by a process comprising the steps of creating an aqueous solution of at least one metavanadate salt selected from the group consisting of $NH_4VO_3$ and $NaVO_3$, and a nitrate salt of the formula $M(NO_3)_n$, containing a large excess of a lithium salt; heating the solution; adding a sufficient amount of a base to obtain a pH greater than 8; and precipitating the amorphous lithiated vanadium metal oxide.

Additionally, these objects, among others, have been achieved by means of a non-aqueous secondary cell comprising an active negative electrode material, an active positive electrode material and an non-aqueous electrolyte, wherein said active negative electrode material is an amorphous binary non-lithiated vanadium metal oxide of the formula $M_yV_zO_{(5z+ny)/2}$, where M is a metal, $0<y\leq3$, $1\leq z\leq4$, and n=2 or 3, said amorphous binary non-lithiated vanadium metal oxide prepared by a process comprising the steps of creating an aqueous solution of at least one metavanadate salt selected from the group consisting of $NH_4VO_3$ and $NaVO_3$, and a nitrate salt of the formula $M(NO_3)_n$, where n=2 or 3; heating the solution; adding a sufficient amount of an acid to obtain a suitable pH for dissolution; and adding a sufficient amount of a base to obtain a pH suitable for precipitating the amorphous binary non-lithiated vanadium metal oxide.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawing, wherein.

DESCRIPTION OF THE INVENTION

Figure 1:
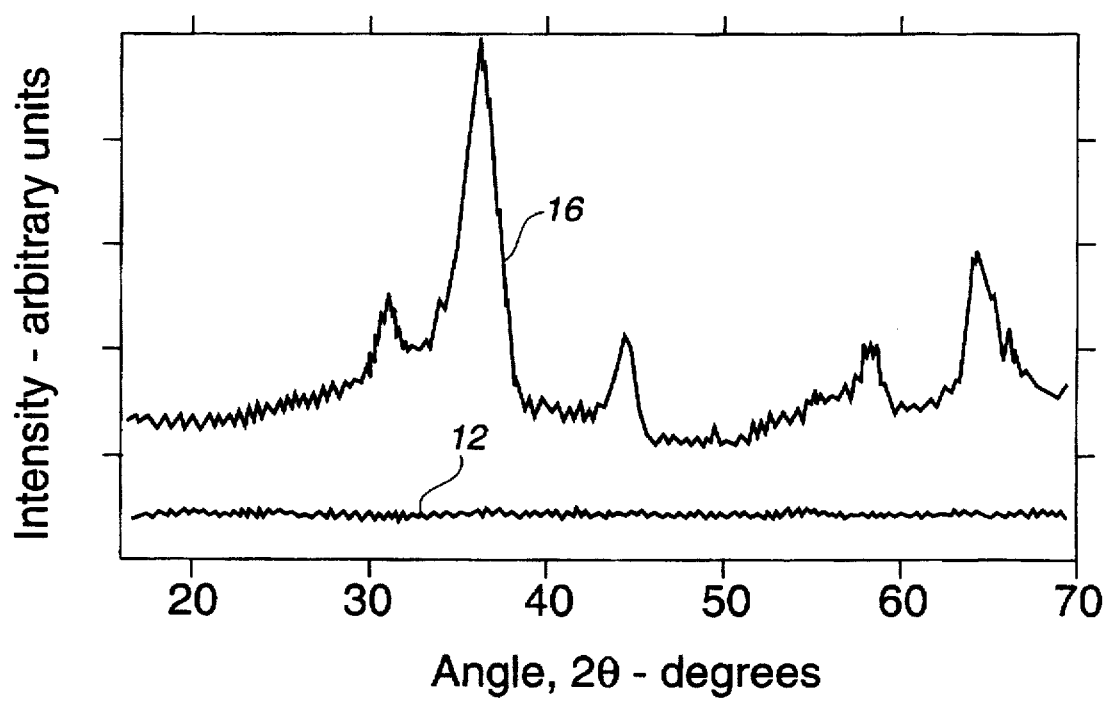
FIG. 1 depicts the respective X-ray diffraction traces of amorphous and crystalline $Li_xNiVO_4$ prepared according to the present invention.

Substituting vanadium oxides for graphite as the negative electrode in rechargeable lithium ion cells results in a reduction of cell output voltage. The average voltage at which these vanadium oxide-based materials intercalate lithium ions is about 1.4 V, as compared an intercalation voltage of about 0.3 V for a conventional graphite negative electrode. Nevertheless, vanadium oxides can reversibly intercalate up to about 7 lithium ions per unit formula, resulting in energy densities of about 800 to 900 Ah/kg, which is about two to two-and-one-half times greater than the energy density of the conventional graphite electrodes. Because of this greater electrochemical capacity of the lithiated vanadium oxides, the energy density of a rechargeable lithium ion cell employing a vanadium oxide as the negative electrode is equivalent to that achieved with a graphite negative electrode, within ±5%.

One peculiar feature of the vanadium oxide-based materials is a propensity to become amorphous upon lithium intercalation/deintercalation, as previously demonstrated by Delmas et al., *J. Power Sources*, 34, 103 (1991). Here, upon discharging an electrochemical cell employing $V_2O_5$ below 1 V, a substantial change was observed in the electrochemical potential relative to the lithium content in $Li_xV_2O_5$ between the first and second discharge. Specifically, a stepwise voltage variation was seen during the initial discharge, while a smooth and continuous variation in voltage relative to lithium content was found with the second discharge.

It is believed that the observed propensity of vanadium metal oxides to become amorphous upon first discharge is a direct result of the characteristics of vanadium. More specifically, it is suggested that this amorphization is a result of the tendency of a vanadium ion to alter its coordination sphere upon reduction. For instance, in $LiNiVO_4$, vanadium is in the +5 oxidation state and possesses a tetrahedral geometry. Upon reduction to the $V^{+4}$ oxidation state, the $V^{+4}$ ion prefers an octahedral coordination sphere as a result of crystal field stabilization. This shift in coordination geometry results in local structural modification. It is believed that the amorphization observed during electrochemical cycling results from such changes in coordination geometry, associated with the reduction in the vanadium oxidation state.

The identical problem regarding amorphization observed with $V_2O_5$, was also found with the new class of lithiated vanadium metal oxides, as disclosed by Guyomard et al. Upon initial discharge of a cell employing a $LiNiVO_4$ electrode, the vanadium electrode became amorphous, resulting in a significantly different voltage/lithium content curve between the first and second discharges.

In addition, it is noted that, upon the cycling of cells, the capacity of $LiMVO_4$-based electrodes (where M is a metal selected from the group of cadmium, cobalt, zinc, nickel, copper, and magnesium) increases significantly, in amounts of up to about 150 percent, making the balancing of lithium ion cells quite difficult. This increase in capacity upon cycling, which is also observed with other cell systems, results from a mechanical processing of the electrode material upon cycling.

Because of these concerns regarding the balancing of lithiated vanadium metal oxide cells, it is preferred to prepare the lithiated vanadium metal oxide compositions in an amorphous state. Conventionally, these materials had been prepared by reacting stoichiometric amounts of lithium carbonate ($Li_2CO_3$), $NH_4VO_3$ and $M(NO_3)_2$, (where M is a metal selected from the group of cadmium, cobalt, zinc, nickel, copper, and magnesium) at 500° C. for 48 hours.

Alternatively, some synthetic methods provided crystalline lithiated vanadium metal oxide compositions, which had to be further processed by means of an amorphization step. Such syntheses are time-consuming, energy-inefficient, and labor-intensive. There remains a need for an efficient and effective method for preparing amorphous $LiMVO_4$.

Because lithiated vanadium metal oxides have generated such significant enthusiasm and widespread research interest regarding their use in lithiated intercalation cells, researchers have focused their attention on the development of effective techniques for manufacturing these compounds. Conventional fabrication of lithiated vanadium oxides requires calcination and annealing at temperatures greater than 500° C. for a period of a several days, a technique which is costly and inefficient.

A new method for producing lithiated vanadium metal oxides of controlled morphology and grain size was sought so as to improve the electrochemical performance of the oxides. This has been attained by a novel process, in which an aqueous solution of at least one metavanadate salt selected from the group consisting of $NH_4VO_3$ and $NaVO_3$, and a nitrate salt of the formula $M(NO_3)_n$, containing a large excess of a lithium salt is constructed; the solution is heated; a sufficient amount of a base is added to obtain a pH greater than 8; and the amorphous lithiated vanadium metal oxide is spontaneously precipitated, providing fine particles of amorphous mixed lithiated vanadium metal oxides, which particles have a relatively large surface area.

In their attempts to provide a simple and effective method for producing non-lithiated vanadium metal oxides of controlled morphology and grain size, various aqueous solution methods were explored by the present inventors. One approach employed vanadium pentoxide and the nitrate salt of iron as starting materials. This method failed when attempts were made to extend it to other elements. A second approach used ammonium metavanadate and the nitrate salt of a metal, both of which were dissolved in concentrated nitric acid. This method produced vanadium metal oxides whose degree of crystallinity was difficult to control, prompting a search for a new method of synthesis.

Moreover, attempts to prepare lithiated vanadium metal oxides by these methods were completely unsuccessful. It is now believed that these methods failed to account for the importance of the pH and the dissociation constant of the precursors. Upon discovering the present methods, however, the inventors were able to synthesize amorphous lithiated vanadium oxides of well-controlled morphology and non-lithiated vanadium oxides of well-controlled morphology.

Initial attempts to synthesize $LiNiVO_4$ by means of solution chemistry were not successful. A solution of $NH_4VO_3$ was mixed with solutions of $Ni(NO_3)_2$ and $LiNO_3$. Stoichiometric amounts of the components of $Li_xNi_yV_zO_{(x+5z+ny)/2}$, where $0<x\leq3$, $0<y\leq3$, $1\leq z\leq4$, and $n=2$ did not result in the expected mixed vanadium metal oxide but, rather, in two different non-lithiated nickel vanadium oxides. The present inventors now believe that, while the chemistry of the various transition metals is quite similar, the chemistry of transition metals and that of alkali metals, such as lithium and sodium, are quite dissimilar, perhaps as a result of the large difference in their respective electronegativities.

To entice the lithium ions to combine with the transition metal ions, the reaction was carried out with a large excess of lithium. However, as this large excess of lithium was added in the form of LiOH, the resultant solution was basic, having a pH greater than 7. Precipitation of amorphous $LiNiVO_4$ was then obtained by further adjusting the pH to a value in the range of about 8.0 to about 9.0, preferably to about 8.5, by the addition of an appropriate base such as $NH_4OH$ or organic bases. Suitable bases include ammonia; amines; alkali hydroxides, including lithium hydroxide. These bases can be added directly or as aqueous solutions of the base.

The present inventors have discovered that amorphous $LiNiVO_4$ can be prepared by a method which does not require calcination and annealing at temperatures greater than 500° C. for a period of a several days. They have found that amorphous lithiated vanadium metal oxides can be prepared by means of a low temperature synthesis, comprising creating an aqueous solution of at least one metavanadate salt selected from the group consisting of $NH_4VO_3$ and $NaVO_3$, and a nitrate salt of the formula $M(NO_3)_n$, containing a large excess of a lithium salt; heating the solution; adding a sufficient amount of a base to obtain a pH greater than 8; and precipitating the amorphous lithiated vanadium metal oxide.

Moreover, this method is not limited to amorphous lithiated vanadium metal oxides, but, rather, can be used to prepare amorphous vanadium oxide-based compounds.

Still further, the present inventors discovered that an amorphous binary non-lithiated vanadium metal oxide of the formula $M_yV_zO_{(5z+ny)/2}$, where M is a metal, $0<y\leq3$, $1\leq z\leq4$, and $n=2$ or $3$, can be prepared by means of a synthesis comprising the steps of creating an aqueous solution of at least one metavanadate salt selected from the group consisting of $NH_4VO_3$ and $NaVO_3$, and a nitrate salt of the formula $M(NO_3)_n$, where $n=2$ or $3$; heating the solution; adding a sufficient amount of a base to obtain a suitable pH for dissolution; and precipitating the amorphous binary non-lithiated vanadium metal oxide.

Other features of the invention will become apparent in the course of the following descriptions of exemplary embodiments which are given for illustration of the invention and are not intended to be limiting thereof.

EXAMPLE 1

Ammonium metavanadate ($NH_4VO_3$) was initially dissolved in water by heating and stirring to yield a solution of about $2.5\times10^{-2}$M. A separate solution of $Ni(NO_3)_2/LiNO_3$ in the ratio of about 1:15 was prepared such that the separate solution had a concentration of $Ni(NO_3)_2$ of about $4.5\times10^{-2}$M. and a concentration of $LiNO_3$ of about 0.7M. When all the $NH_4VO_3$ had dissolved, the cold solution of nitrate salts was added. The pH of the resultant solution was 5 and no precipitation occurred. While the solution was heated (80° C. to 90° C.) and stirred, the pH was adjusted to 8.5 by means of a 3N ammoniacal solution. A yellow precipitate appeared spontaneously. The mixture continued to be stirred and heated for about 10 minutes.

Filtration of the precipitate was carried out with a 0.1 µm filter. In an alternate embodiment of the present invention, the precipitate can be separated from the filtrate by means of centrifugation. The solid precipitate, which was yellow-green in color, was then washed sequentially with water and ethanol to entrain and remove $NH_3$. The precipitate was then dried in a 50° C. oven for about 12 hours. X-ray diffraction analysis of the solid indicated that the lithiated vanadium metal oxide was amorphous, as shown by the relatively featureless trace 12 in FIG. 1. The sample was then heated at 300° C. for about 10 hours during which crystallization developed, as was confirmed in trace 16 of subsequent room temperature X-ray analysis.

By carrying out a series of annealings at 50° C. increments over a temperature range from 300° C. to 800° C., continuous growth of diffraction peaks was observed under X-ray analysis. The amorphous mixture was additionally confirmed by means of differential thermal analysis. After annealing at 800° C., at which it crystallized as a perfect crystal, the solid was identified as LiNiVO₄ by X-ray analysis (JCPDS 38-1395). To verify the stoichiometry of the compound, determination of the Li/Ni/V ratio was carried out by means of atomic absorption spectroscopy (AAS) analysis of the redissolved precipitate. The results confirmed the LiNiVO₄ formula. The observed data is consistent with the phase diagram of LiNiVO₄ provided in *Chem. Bull. Soc. Jap.*, 11, 1483 (1979).

The specific surface area of both the amorphous lithiated vanadium nickel oxide and the crystallized lithiated vanadium nickel oxide were measured, with the amorphous material having a specific surface area of about 30 to 36 m²/g and the crystalline material (annealed at 700° C.) having a specific surface area of about 3 to 4 m²/g.

EXAMPLE 2

A rechargeable lithium cell using the amorphous lithiated vanadium oxide $Li_xNiVO_4$ of Example 1 as the active material of the positive electrode and lithium metal as the active material of the negative electrode was constructed in a Swagelock-type assembly. The positive electrode was prepared from a 0.3 mm thick film of 6 parts by weight of carbon black and 56 parts of $Li_xNiVO_4$ intimately dispersed in a binder matrix of 16 parts of an 88:12 vinylidene fluoride:hexafluoropropylene (PVDF:HFP) copolymer and 16 parts of compatible dibutylphthalate (DBP) plasticizer. A disk of 1 cm² was cut from the film and immersed in diethyl ether to extract substantially all the DBP plasticizer from the electrode composition. The DBP-free positive electrode disk, after drying under vacuum for 1 hour, was placed in a dry box under a helium atmosphere.

Figure 2:
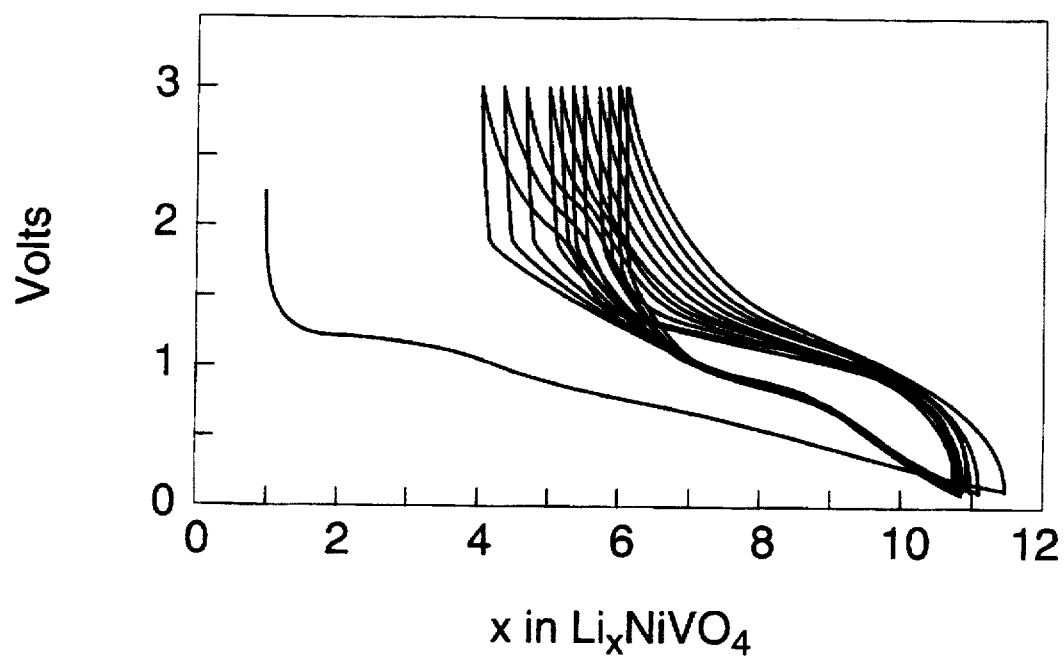
FIGS. 2 and 3 respectively depict the voltage/lithium content curve and the capacity/cycle number curve of a cell employing amorphous $Li_xNiVO_4$ as the active positive electrode material v. Li.
Figure 3:
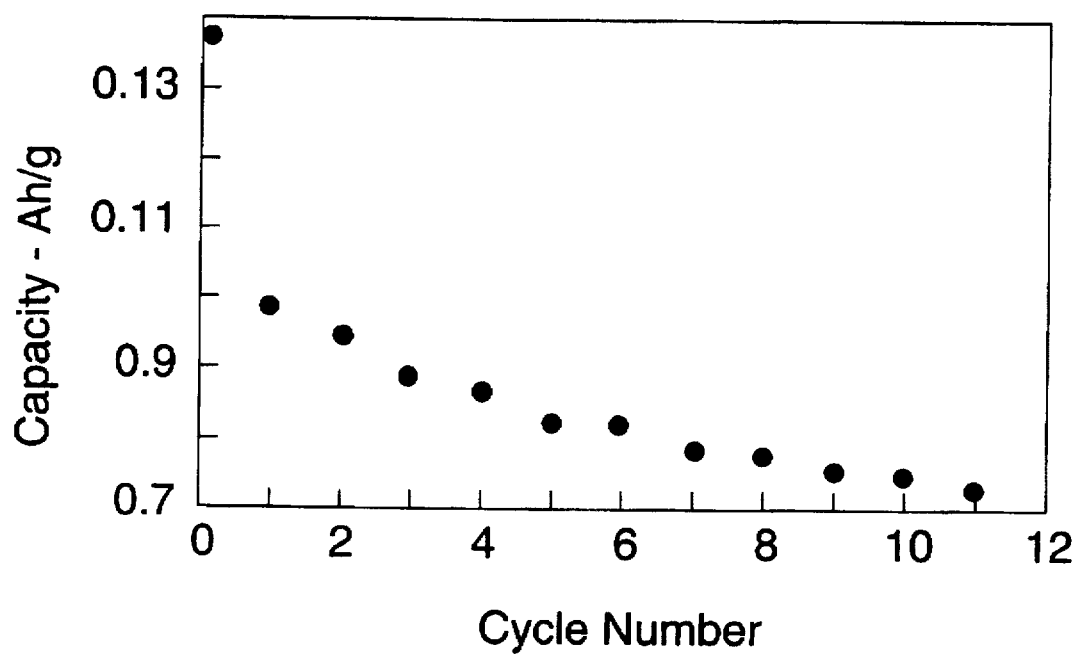

The negative electrode of the same size was prepared from a lithium metal foil pasted onto a nickel disk. The positive and negative electrodes were electrically isolated by a separator disk cut from a silica fiber mat, and soaked in an electrolyte solution of 1M $LiPF_6$ in an solvent mixture of ⅓ dimethyl carbonate and ⅔ ethylene carbonate. The cell assembly was then inserted into Swagelock hardware where physical contact between the cell components was ensured by spring pressure while the cell was maintained air-tight by stainless steel plungers. The cell was then removed from the dry box for electrochemical testing over a number of charge/discharge cycles between 0.05 V and 3 V by means of a MacPile system operating in a galvanostatic mode. FIGS. 2 and 3 respectively depict the voltage/lithium content curve and the capacity/cycle number curve for the amorphous $Li_xNiVO_4$ cell.

EXAMPLE 3

Figure 4:
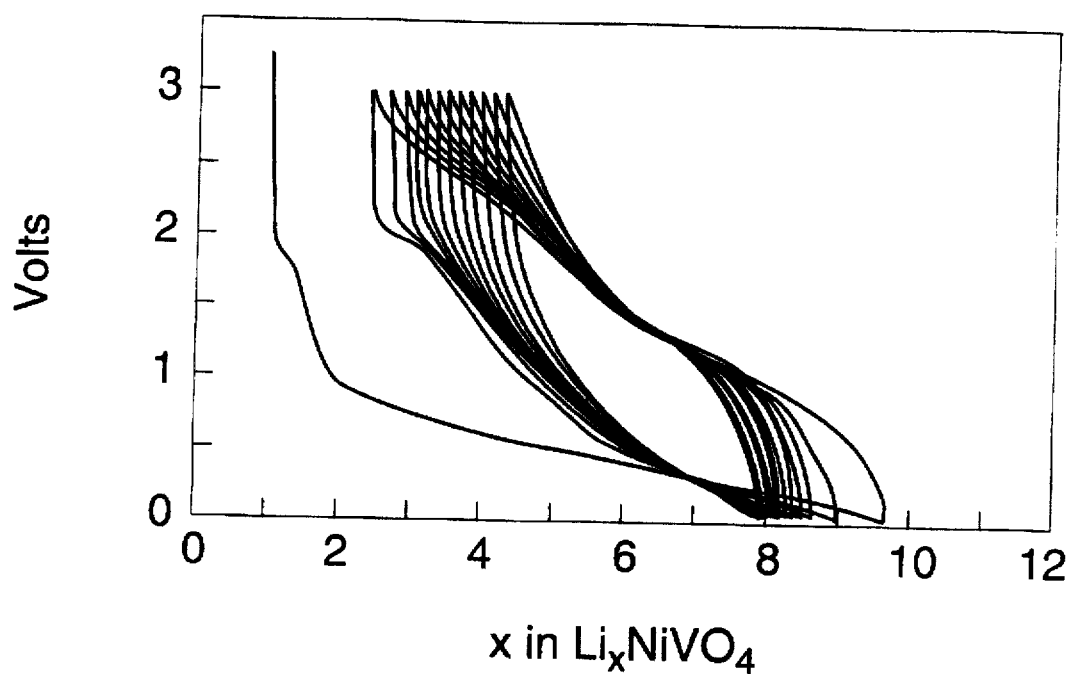
FIGS. 4 and 5 respectively depict the voltage/lithium content curve and the capacity/cycle number curve of a cell employing crystalline $Li_xNiVO_4$ as the active positive electrode material v. Li.
Figure 5:
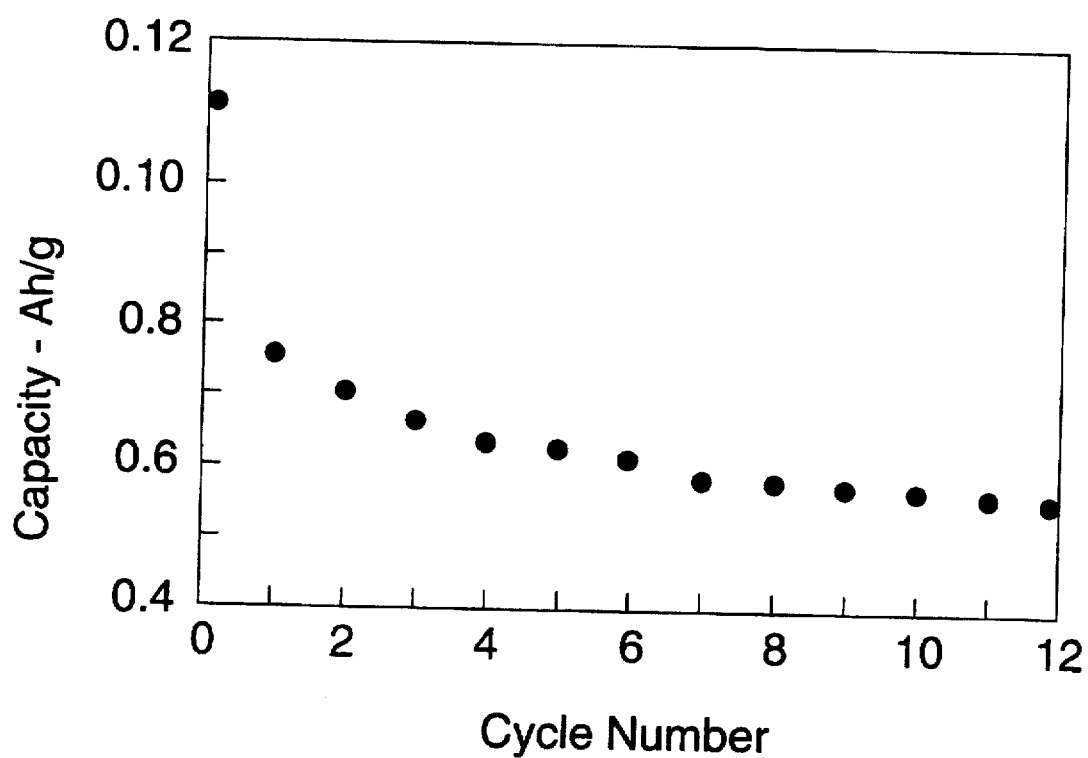

A cell was similarly prepared employing the crystalline rather than the amorphous $Li_xNiVO_4$ material of Example 1 as the active positive electrode component. FIGS. 4 and 5 respectively illustrate the voltage/lithium content curve and the capacity/cycle number of the cell. With both cells, about 7 lithium ions per unit formula can be reversibly intercalated. However, the initial capacity achieved with amorphous $Li_xNiVO_4$ is larger than that obtained with crystalline $Li_xNiVO_4$, resulting in capacities for cells employing amorphous $Li_xNiVO_4$ as large as 920 mAh/g, about 2.5 times greater that obtained with a conventional graphite electrode.

Further, with the method of the present invention, it is not necessary to slowly transform the crystallized phase into an unordered amorphous phase. Thus, the desired ternary lithiated vanadium metal oxide is produced directly in an efficient and effective synthesis, in contrast to the time-consuming, energy-inefficient, and labor-intensive conventional process. Moreover, these graphs indicate that the amorphous phase can reversibly intercalate as many lithium ions as the crystallized phase, but at a faster rate.

As noted, it is possible to transform the initial amorphous stage into the corresponding crystallized phase by annealing at 800° C. It is also possible to re-amorphize the crystallized phase by means of mechanical processing, e.g., using a Spex 8000 impact ball mill, for use in a rechargeable cell, as is shown in the following example.

EXAMPLE 4

Figure 6:
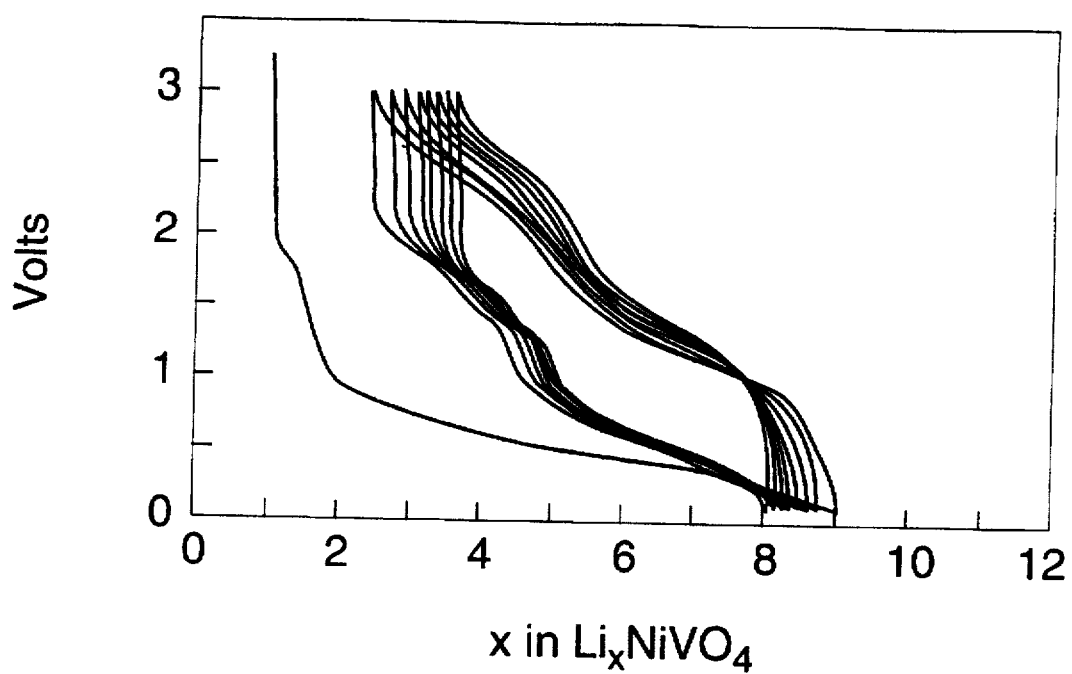
FIGS. 6 and 7 respectively depict the voltage/lithium content curve and the capacity/cycle number curve of a cell employing $Li_xNiVO_4$, re-amorphized by mechanical grinding, as the active positive electrode material v. Li.
Figure 7:
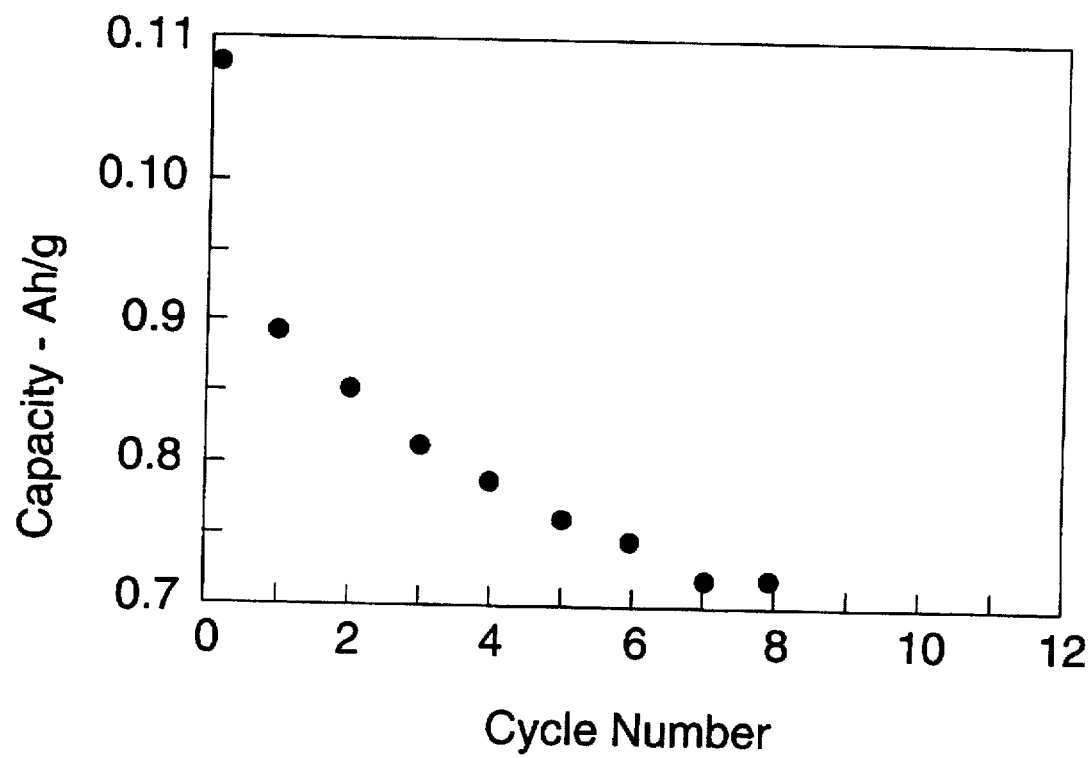

Two stainless steel balls were placed with 1 g of the crystalline $Li_xNiVO_4$ material of Example 1 in a 25 cm³ airtight, sealed cell. The cell was mounted onto a Spex 8000 apparatus and ball-milled for 80 hours. The crystalline $Li_xNiVO_4$ was re-amorphized in this operation and the resulting material was substituted for the active positive electrode material of Example 2 in preparing a test cell. FIGS. 6 and 7 respectively depict the voltage/lithium content curve and the capacity/cycle number curve for the resulting cell.

The slight increase in the irreversible loss of capacity observed between the first discharge and first charge of a cell containing the re-amorphized $Li_xNiVO_4$ is consistent with the small increase in specific surface area observed with the re-amorphized sample (6 m²/g) relative to the specific surface area of the crystallized sample (3 m²/g). Further, the irreversible loss of capacity between the first discharge and the first charge supports the hypothesis that such capacity loss occurs by means of a catalytic decomposition of the electrolyte on the surface of the metal oxide. It is also to be noted that the first discharge voltage is greater for the amorphous phase than for the crystallized phase. This observation is again consistent with the larger degree of amorphization. As the degree of disorder in the structure increases, the Fermi level rises in energy, resulting in an increase in the intercalation voltage.

Further, upon cycling, the observed capacity of the amorphous $Li_xNiVO_4$-based cell remains more constant than the capacity of the crystalline $Li_xNiVO_4$-based cell. Moreover, the capacity does not increase as had previously been observed with the crystalline lithiated vanadium oxides. It is believed that this constant capacity is a direct result of the initial amorphous character of the lithiated vanadium metal oxide produced by the process of the present invention, in contrast to the cycling that is required with the conventional syntheses of the crystalline lithiated vanadium oxide to achieve the proper degree of amorphization.

EXAMPLE 5

A process analogous to that of Example 1 was employed in the synthesis of $LiCoVO_4$. Ammonium metavanadate ($NH_4VO_3$) was initially dissolved in water with heating and stirring to yield a solution of about $2.5 \times 10^{-2}$M. A separate solution of $Co(NO_3)_2/LiNO_3$ in a ratio of about 1:20 was prepared such that the separate solution had a $Co(NO_3)_2$ concentration of about $4.5 \times 10^{-2}$M and a $LiNO_3$ concentration of about 0.7M. When the $NH_4VO_3$ had been completely dissolved, the cold solution of nitrate salts was added. The pH of the resultant mixture was 5 and no precipitation occurred. While the solution was heated to a temperature of about 80° C. to 90° C. and stirred, the pH was adjusted to 8.5 by addition of aliquots of a 3N ammoniacal solution. An orange precipitate appeared spontaneously. The mixture continued to be stirred and heated for about 10 minutes. The amorphous $LiCoVO_4$ phase was recovered by centrifugation, and washed with water and ethanol to entrain and remove $N_3$. The precipitate was then dried in a 50° C. oven for a few hours. X-ray diffraction analysis of the solid indicated that the lithiated vanadium metal oxide was amorphous. Upon heating the amorphous powder, $LiCoVO_4$ appeared to be the predominant component.

The analogous approach can be employed in the synthesis of other amorphous $Li_xM_yV_zO_{(x+5z+ny)/2}$, where M is a metal selected from the group of manganese, cobalt, iron, nickel, copper, cadmium, chromium, magnesium, aluminum, and indium, $0<x\leq3$, $0<y\leq3$, $1\leq z\leq4$, and n=2 or 3.

Employing molar proportions of Ni:V:Li::1:1:1, non-lithiated amorphous vanadium oxides have been synthesized. These compounds were later obtained in their stoichiometric conditions, without employing $LiNO_3$ as reagent.

At a pH of 8.5, the analogous vanadium oxide $Ni_3(VO_4)_2$ was obtained when the Li/Ni ratio was zero or insufficient. Therefore, the structures are different for $LiNiVO_4$ and $Ni_3(VO_4)_2$.

When the pH was reduced below the preferred range, $Ni_2V_2O_7$ was obtained. The pH of the solution containing $Ni(NO_3)_2$ and $NH_4VO_3$ must be initially decreased to 2 by means of concentrated acid, for example $HNO_3$. Afterwards, the pH is raised to a range of about 4 to about 5 so as to induce precipitation. During the initial pH adjustment from about 5 to about 2, the solution remained translucent. After washing and filtration, X-ray diffraction analysis of the resultant solid indicated that the solid phase was amorphous. Successive annealings of the solid precipitate did not progress towards crystallization as clearly as with $Ni_3(VO_4)_2$ and $LiNiVO_4$.

Under stoichiometric conditions, Ni:V::3:2 for $Ni_3(VO_4)_2$ and Ni:V::1:1 for $Ni_2V_2O_7$, the corresponding vanadium oxides were obtained.

Binary non-lithiated vanadium oxides of the formula $M_yV_zO_{(5z+ny)/2}$, where M is a metal selected from the group of manganese, cobalt, iron, nickel, copper, cadmium, chromium, magnesium, aluminum, and indium, $0<y\leq3$, $1\leq z\leq4$, and n=2 or 3; $MVO_4$, can be obtained by analogous aqueous syntheses.

EXAMPLE 6

Figure 8:
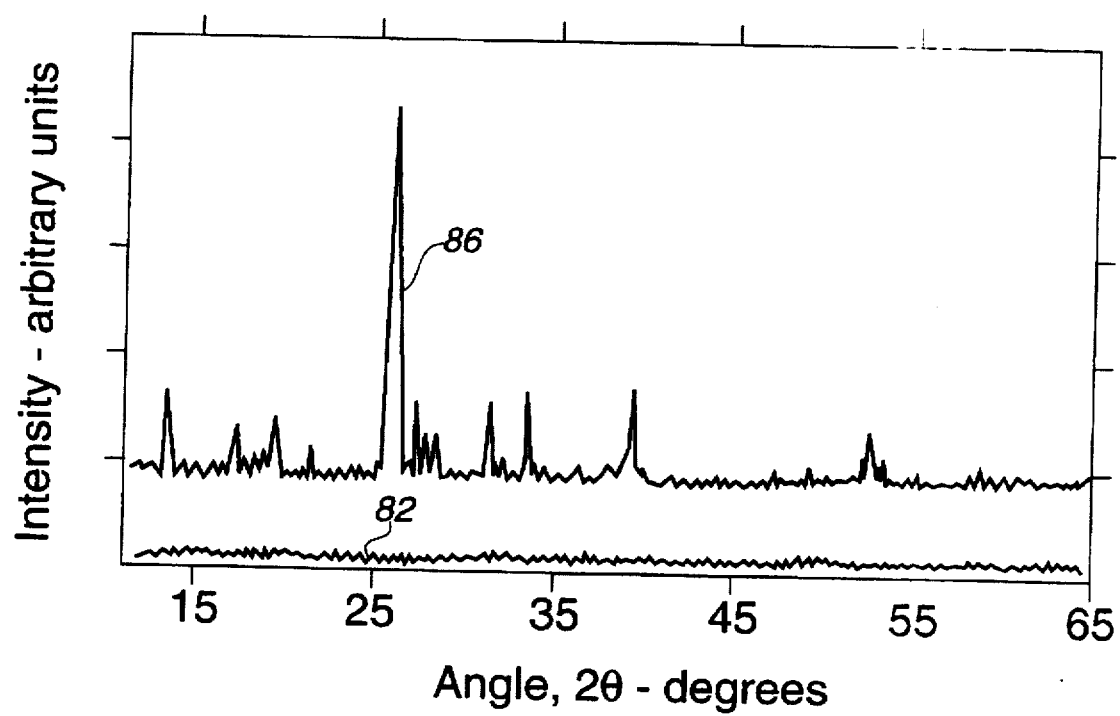
FIG. 8 depicts the respective X-ray diffraction traces of amorphous and crystalline $InVO_4$ prepared according to the present invention.

A solution of about $2.5\times10^{-2}$M $NH_4VO_3$ was mixed with a solution of about $4.5\times10^{-2}$M $In(NO_3)_3.5H_2O$. The pH of the resultant solution was about 2 to about 2.5. Instantaneously upon mixing, a precipitate was observed. To ensure complete reaction, the precipitate was redissolved by lowering the pH of the solution to about 1 with the addition of aliquots of 3N $HNO_3$. The pH of the solution was then raised to about 4 by gently adding 3N $NH_4OH$, at which pH the amorphous $InVO_4$ precipitated. At a pH greater than about 4, $In(OH)_3$ was observed, while at a pH lower than about 4, vanadium oxide $(V_2O_5)$ or its ammoniacal salt $(NH_4VO_3)$ appeared. Thermal analysis of the resulting amorphous phase at a rate of 10° C. per minute indicated an approximate structural sequence in which, with increasing temperature, an initial amorphous $InVO_4.2.6H_2O$ is transformed into amorphous $InVO_4$ which, in turn, at a temperature of about 550° C. is transformed into monoclinic $InVO_4$, which is then transformed into orthorhombic $InVO_4$ at a temperature of about 730° C. As in Example 1, X-ray diffraction analysis, depicted respectively in traces 82 and 86 of FIG. 8, confirmed the structures of the amorphous and monoclinic phases.

Figure 9:
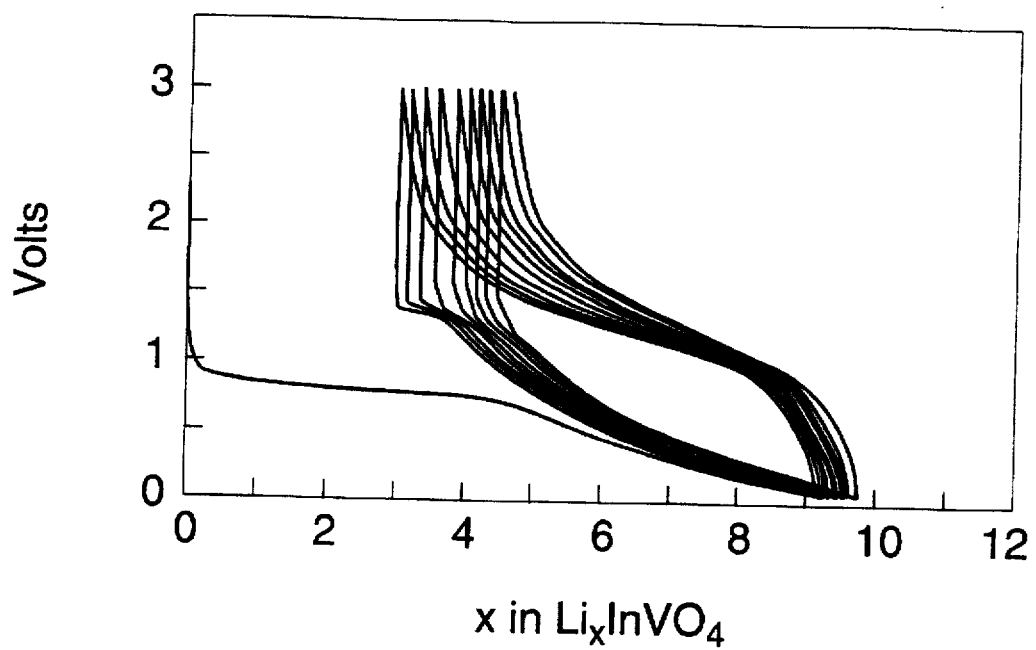
FIGS. 9 and 10 depict the voltage versus lithium content curves for cells employing $InVO_4$ as the active positive electrode material v. Li and cycled, respectively, with varying relaxation times.
Figure 10:
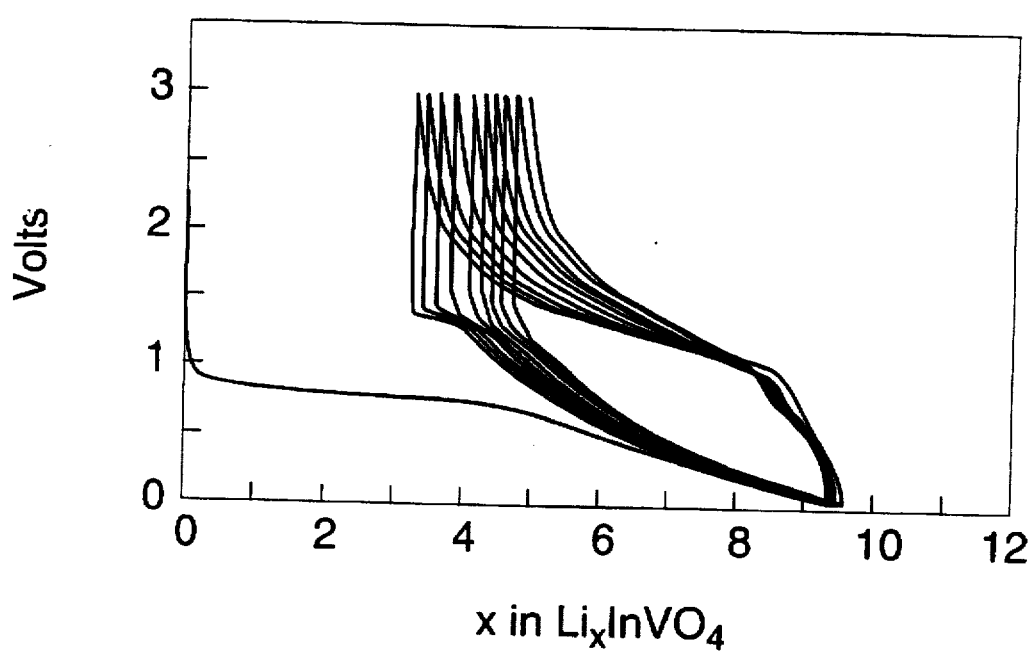

Swagelock test cells were prepared as in Example 2 employing the amorphous $InVO_4$ as the active positive electrode material. Resulting cells were likewise tested in the MacPile system at a C/4 rate with a variation in relaxation time between charge and discharge cycles of 0.003 hours and 0.25 hours. The voltage/lithium content curves for such cell tests over the first 10 cycles are shown, respectively, in FIGS. 9 and 10. In both cases an irreversible component of self-discharge corresponding to about 3 lithium atoms per formula unit and a reversible component of self-discharge of about 6 lithium atoms per formula unit were observed. These results correlate with an initial capacity of about 900 mAh/g and represent the first time that lithium intercalation into an amorphous non-lithiated vanadium oxide has been achieved.

EXAMPLE 7

Figure 11:
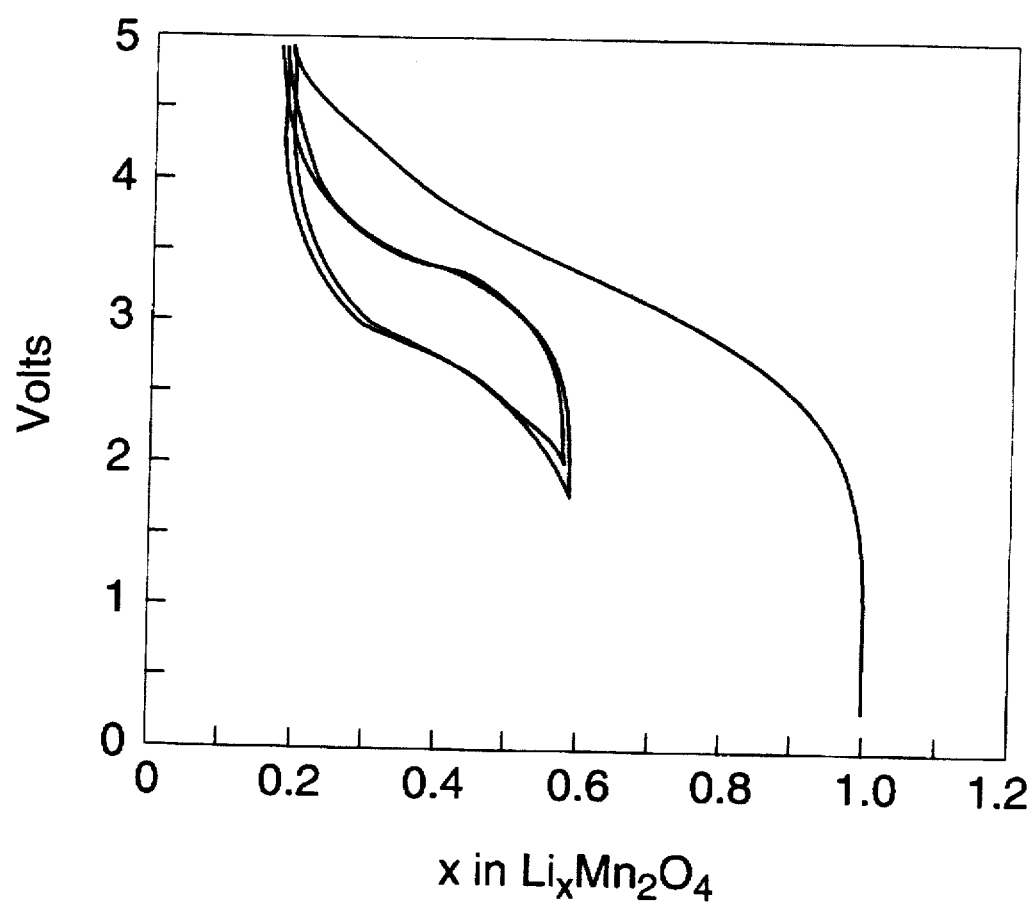
FIG. 11 depicts the voltage versus lithium content curve for a Li-ion cell employing $InVO_4$ prepared according to the present invention as the active negative electrode material v. $Li_xMn_2O_4$.

In the foregoing examples, the ability of the prepared amorphous vanadium oxides to intercalate large amounts of lithium at low voltages was shown through the simpler expedient of electrolytic cells comprising negative electrodes of lithium metal and positive electrodes incorporating the vanadium oxide. These latter materials, however, are no less effective in the role of active negative electrode components which are particularly useful in the more desirable Li-ion cells described, for example, in U.S. Pat. No. 5,460,904. Electrodes for such an exemplary cell were prepared in the described manner using as the negative electrode a film of $LiNiVO_4$ composition according to Example 2, above. A positive electrode was prepared as described in the noted patent in the form of a 0.2 mm thick film of 56 parts by weight of finely-divided $LiMn_2O_4$, 6 parts of carbon black, 15 parts of the PVdF:HFP copolymer, and 23 parts of DBP plasticizer. An electrolyte/separator film according to the patent was formed as a 85 μm thick film of the copolymer mixed with equal parts of DBP. The films were then assembled with the separator between the electrode components and the assembly was laminated with heat and pressure. A 1 cm² disk was cut from the laminate and immersed in diethyl ether to extract a substantial portion of the DBP plasticizer, and the disk was then immersed in the electrolyte solution of Example 2 which was absorbed into the copolymer matrix to activate the cell. The cell was then mounted in a Swagelok apparatus and tested in cycling between 4.5 V and 2 V with a current density of 350 mA/cm². The results of such cycling are shown in FIG. 11.

It is expected that other embodiments and variations of the present invention will be apparent to the skilled practitioner in light of the above teachings, and such embodiments and variations are nonetheless considered to be within the scope of the appended claims.

What is claimed is:

1. A method for preparing an amorphous ternary lithiated vanadium metal oxide of the formula $Li_xM_yV_zO_{(x+5z+ny)/2}$, where M is a metal, $0<x\leq3$, $0<y\leq3$, $1\leq z\leq4$, and n=2 or 3 characterized in that
   a) an aqueous solution is prepared of
      1) at least one metavanadate salt selected from the group consisting of $NH_4VO_3$ and $NaVO_3$,
      2) a nitrate salt of the formula $M(NO_3)_n$, where M is said metal, and
      3) an excess of a lithium salt;
   b) the resulting solution is heated; and c) a sufficient amount of a base is added to the heated solution to obtain a pH suitable for precipitating the amorphous lithiated vanadium metal oxide.

2. A method according to claim 1 characterized in that said aqueous solution is prepared by mixing
   a) a first aqueous solution comprising said metavanadate salt; and
   b) a second aqueous solution comprising said nitrate and lithium salts.

3. A method according to claim 1 wherein said base is selected from the group consisting of ammonia, amines, alkali hydroxides, alkaline earth hydroxides, alkali salts of alcohols, and alkali salts of carboxylic acids.

4. A method according to claim 1 wherein said base is added in the form of an aqueous solution of said base.

5. A method according to claim 1 wherein said lithium salt is selected from the group consisting of $LiNO_3$, $LiOH$, $LiOH \cdot H_2O$, and $Li_2CO_3$.

6. A method according to claim 1 wherein said heating comprises heating the solution to a temperature in the range of about 80° C. to 95° C.

7. A method according to claim 1 wherein said metal is at least one metal selected from the group consisting of manganese, cobalt, iron, copper, cadmium, nickel, chromium, indium, aluminum, and magnesium.

8. A non-aqueous secondary battery cell comprising an active negative electrode material, an active positive electrode material, and an non-aqueous electrolyte characterized in that said active positive electrode material is an amorphous vanadium metal oxide selected from the group consisting of:
   a) ternary lithiated vanadium metal oxides of the formula $Li_xM_yV_zO_{(x+5z+ny)/2}$, where M is a metal, $0<x\leq3$, $0<y\leq3$, $1\leq z\leq4$, and n=2 or 3; and
   b) binary non-lithiated vanadium metal oxides of the formula $M_yV_zO_{(5z+ny)/2}$, where M is a metal, $0<y\leq3$, $1\leq z\leq4$, and n=2 or 3.

9. A non-aqueous secondary battery cell comprising an active negative electrode material an active positive electrode material, and a non-aqueous electrolyte characterized in that said active positive electrode material is an amorphous vanadium metal oxide consisting of a ternary lithiated vanadium metal oxide of the formula $Li_xM_yV_zO_{(x+5z+ny)/2}$, where M is a metal, $0<x\leq3$, $0<y\leq3$, $1\leq z\leq4$, and n=2 or 3 and prepared by a process according to claim 1.

10. A non-aqueous secondary battery cell comprising an active negative electrode material, an active positive electrode material, and a non-aqueous electrolyte characterized in that said active positive electrode material is a binary non-lithiated vanadium metal oxide of the formula $M_yV_zO_{(5z+ny)/2}$, where M is a metal, $0<y\leq3$, $1\leq z\leq4$, and n=2 or 3 and prepared by a process according to claim 8.

11. A non-aqueous secondary battery cell comprising an active negative electrode material, an active positive electrode material, and an non-aqueous electrolyte characterized in that said active negative electrode material is an amorphous vanadium metal oxide selected from the group consisting of:
   a) ternary lithiated vanadium metal oxides of the formula $Li_xM_yV_zO_{(x+5z+ny)/2}$, where M is a metal, $0<x\leq3$, $0<y\leq3$, $1\leq z\leq4$, and n=2 or 3; and
   b) binary non-lithiated vanadium metal oxides of the formula $M_yV_zO_{(5z+ny)/2}$, where M is a metal, $0<y\leq3$, $1\leq z\leq4$, and n=2 or 3.

12. A non-aqueous secondary battery cell comprising an active negative electrode material, an active positive electrode material, and a non-aqueous electrolyte characterized in that said active negative electrode material is a ternary lithiated vanadium metal oxide of the formula $Li_xM_yV_zO_{(x+5z+ny)/2}$, where M is a metal, $0<x\leq3$, $0<y\leq3$, $1\leq z\leq4$, and n=2 or 3 and prepared by a process according to claim 1.

13. A non-aqueous secondary battery cell comprising an active negative electrode material, an active positive electrode material, and a non-aqueous electrolyte characterized in that said active negative electrode material is a binary non-lithiated vanadium metal oxide of the formula $M_yV_zO_{(5z+ny)/2}$, where M is a metal, $0<y\leq3$, $1\leq z\leq4$, and n=2 or 3 and prepared by a process according to claim 8.

* * * * *